(12) United States Patent
Min (10) Patent No.: US 10,569,709 B2
(45) Date of Patent: Feb. 25, 2020

(54) APPARATUS AND METHOD FOR CONTROLLING VIRTUAL ENGINE SOUND OF VEHICLE

(71) Applicants: Hyundai Motor Company, Seoul (KR); Kia Motors Corporation, Seoul (KR)

(72) Inventor: Kyung Deuk Min, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 240 days.

(21) Appl. No.: 15/785,180

(22) Filed: Oct. 16, 2017

(65) Prior Publication Data
US 2018/0178719 A1  Jun. 28, 2018

(30) Foreign Application Priority Data
Dec. 28, 2016  (KR) .................. 10-2016-0181351

(51) Int. Cl.
| | |
|---|---|
| B60W 30/09 | (2012.01) |
| B60Q 5/00 | (2006.01) |
| G08G 1/16 | (2006.01) |
| G10K 15/02 | (2006.01) |

(52) U.S. Cl.
CPC .............. *B60Q 5/008* (2013.01); *B60Q 5/006* (2013.01); *G08G 1/166* (2013.01); *G10K 15/02* (2013.01)

(58) Field of Classification Search
CPC ....... B60Q 5/008; B60W 5/006; B60W 30/09; G08G 1/166; B01K 15/02
See application file for complete search history.

(56) References Cited

U.S. PATENT DOCUMENTS

| | | | | |
|---|---|---|---|---|
| 9,108,562 | B2* | 8/2015 | Lee ................... | B60Q 5/008 |
| 2013/0114827 | A1* | 5/2013 | Lee ................... | B60Q 5/008 |
| | | | | 381/86 |
| 2015/0151680 | A1* | 6/2015 | Park ................... | B60Q 5/008 |
| | | | | 381/86 |
| 2016/0016560 | A1* | 1/2016 | Parker ................ | B60W 30/09 |
| | | | | 701/70 |

FOREIGN PATENT DOCUMENTS

KR  10-2016-0050650 A  5/2016

OTHER PUBLICATIONS

Leitao et al., Graphical control of autonomous, virtual vehicles, 2000, IEEE, p. 507-511 (Year: 2000).*

* cited by examiner

*Primary Examiner* — McDieunel Marc
(74) *Attorney, Agent, or Firm* — Morgan, Lewis & Bockius LLP (57) ABSTRACT

A virtual engine sound control apparatus and method for a vehicle may include an output device configured to output a virtual engine sound while the vehicle is driven, a detector configured to detect state information related to at least one object positioned in front of the vehicle while the vehicle is driven, and a controller configured to control the output device to generate the virtual engine sound according to the detected state information, providing a silent indoor environment of a vehicle to a driver by determining a pedestrian state to generate a virtual engine sound.

15 Claims, 8 Drawing Sheets

$\theta\_e = \arcsin(2c/(c+d)-1)$

FIG. 5A $\theta\_e = table(e, f/(f+g))$

FIG. 5B $\theta\_e = table(e, h/(h+g))$

PEDESTRIAN WHO USES VEHICLE

FIG. 7B

PEDESTRIAN WHO USES MOBILE DEVICE

APPARATUS AND METHOD FOR CONTROLLING VIRTUAL ENGINE SOUND OF VEHICLE

The present application claims priority to Korean Patent Application No. 10-2016-0181351, filed on Dec. 28, 2016, the entire contents of which is incorporated herein for all purposes by this reference.

BACKGROUND OF THE INVENTION

Field of the Invention

The present invention relates to a control apparatus of a vehicle, and more particularly, to an apparatus and method for controlling a virtual engine sound of a vehicle, for controlling the virtual engine sound to alert a pedestrian that there is a vehicle around while driving of a vehicle in an electric vehicle mode.

Discussion of the Related Art

According to the report "Inclusive Growth Orientation and Traffic Safety of Korea Road" by the Organization for Economic Cooperation and Development (OECD), there is a problem in that the number of pedestrian deaths from traffic accidents per hundred thousand Koreans from 2000 to 2016 averaged 5.2, highest among OECD member countries.

That is, "Risk of Use of Smartphone on Walking Safety" by the Korea Transportation Safety Authority has announced that risk of accident is determined to be increased by 76% when a pedestrian uses a smartphone while walking.

An eco-friendly vehicle barely generates running noise while driving in an electric vehicle mode and, accordingly, the vehicle generates a virtual engine sound to warn pedestrians, but eco-friendly vehicle owners may be dissatisfied with the virtual engine sound.

Now, there is a need for a method of controlling a virtual engine sound for providing information to a pedestrian who has to be careful while providing silence to a driver if possible.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for controlling a virtual engine sound of a vehicle that substantially obviates one or more problems due to limitations and disadvantages of the related art.

Various aspects of the present invention are directed to providing an apparatus and method for controlling a virtual engine sound of a vehicle, for generating a virtual engine sound to warn pedestrians when a plurality of pedestrians is present in front of a driving vehicle.

Various aspects of the present invention are directed to providing an apparatus and method for controlling a virtual engine sound of a vehicle, for generating a virtual engine sound to warn pedestrians when a pedestrian in front of a driving vehicle is not looking at the vehicle.

A further object of the present invention is to provide an apparatus and method for controlling a virtual engine sound of a vehicle, for generating a virtual engine sound to warn pedestrians when a child or an elderly person is present in front of the vehicle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure pointed out in the written description and claims hereof as well as the appended drawings.

To achieve these objects and other advantages and in accordance for the invention, as embodied and broadly described herein, a virtual engine sound control apparatus for a vehicle includes an output device configured to output a virtual engine sound while the vehicle is driven, a detector configured to detect state information related to at least one object positioned in front of the vehicle while the vehicle is driven, and a controller configured to control the output device configured to generate the virtual engine sound according to the detected state information.

In another aspect of the present invention, a virtual engine sound control method of a vehicle includes detecting state information related to at least one object positioned in front of a vehicle that is driving at predetermined speed or more, and generating a virtual engine sound for recognizing the vehicle by the at least one object according to the detected state information.

The methods and apparatuses of the present invention have other features and advantages which will be apparent from or are set forth in more detail in the accompanying drawings, which are incorporated wherein, and the following Detailed Description, which together serve to explain predetermined principles of the present invention.

It may be understood that the appended drawings are not necessarily to scale, presenting a somewhat simplified representation of features illustrative of the basic principles of the invention. The predetermined design features of the present invention as disclosed wherein, including, for example, predetermined dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also alternatives, modifications, equivalents and other embodiments, which may be included within the spirit and scope of the invention as defined by the appended claims.

Exemplary embodiments of the present invention are described in detail so as for those of ordinary skill in the art to easily implement with reference to the accompanying drawings. However, the present invention may be implemented in different forms and is not limited to these embodiments. To clearly describe the present invention, a part without concerning to the description is omitted in the drawings, and like reference numerals in the specification denote like elements.

Throughout the specification, one of ordinary skill would understand terms 'include', 'comprise', and 'have' to be interpreted in default as inclusive or open rather than exclusive or closed unless expressly defined to the contrary. Further, the terms such as "unit", "module", etc. disclosed in the specification mean devices for processing at least one function or operation, which may be implemented by hardware, software, or a combination thereof.

Throughout the specification, one of ordinary skill would understand terms 'include', 'comprise', and 'have' to be interpreted in default as inclusive or open rather than exclusive or closed unless expressly defined to the contrary. Throughout the present specification, the same reference numerals in the drawings denote the same element.

Hereinafter, a method of a controlling virtual engine sound of a vehicle according to exemplary embodiments of the present invention will be described in detail with respect to FIGS. 1 to 7.

Figure 1:
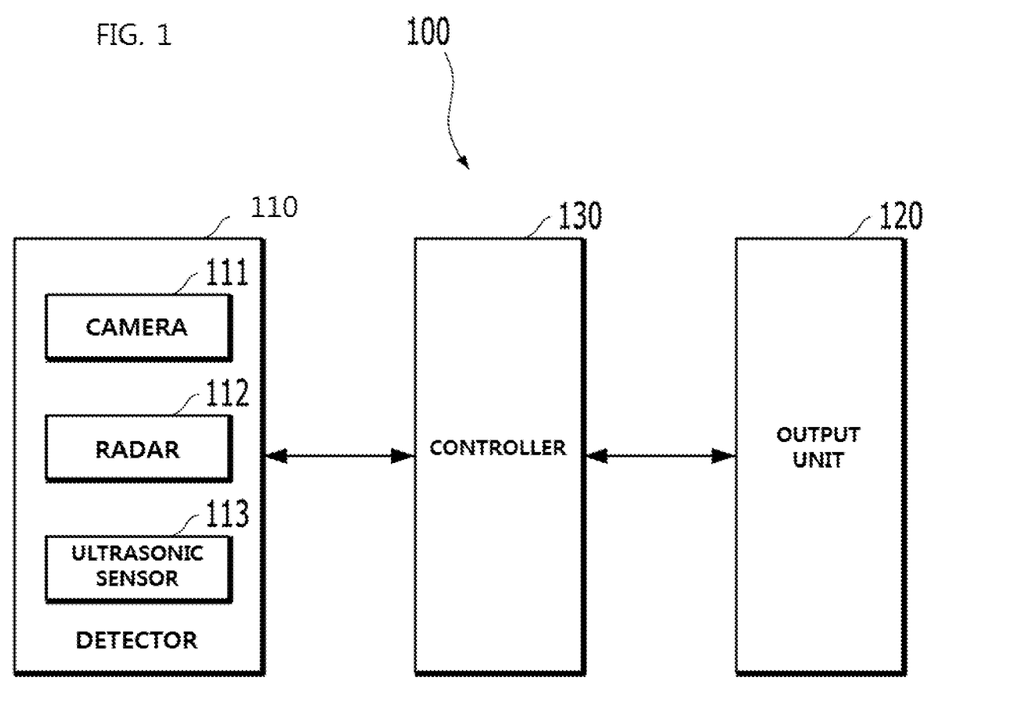
FIG. 1 is a block diagram illustrating an example of a virtual engine sound control apparatus according to an exemplary embodiment of the present invention.

FIG. 1 is a block diagram illustrating an example of a virtual engine sound control apparatus according to an exemplary embodiment of the present invention.

FIG. 2, FIG. 3, FIG. 4, FIG. 5, FIG. 6, and FIG. 7 are diagrams for explanation of a method of a controlling virtual engine sound of a vehicle according to an exemplary embodiment of the present invention.

Referring to FIGS. 1 to 7, a virtual engine sound control apparatus 100 of a vehicle according to an exemplary embodiment of the present invention may include a detector 110 for detecting state information related to at least one object in front of the vehicle while the vehicle is driven in an electric vehicle mode, an output device 120 for outputting virtual engine sound while the vehicle is driven in an electric vehicle mode, and a controller 130 for controlling the output device 120 configured to generate virtual engine sound according to detected state information.

In the instant case, the vehicle according to an exemplary embodiment of the present invention may include at least one of an electric vehicle that uses only electricity as power, a gasoline hybrid vehicle that selectively uses electricity and gasoline, and a diesel hybrid vehicle that selectively uses electricity and diesel.

In addition, the at least one object is an object positioned within a predetermined radius of a driving vehicle and includes a pedestrian, an animal, and so on. Hereinafter, the at least one object is assumed to be a pedestrian. The predetermined radius refers a radius in which a pedestrian crashes with an adjacent actual vehicle when he or she does not recognize the vehicle.

The detector 110 may include a camera 111 disposed on a front glass of the vehicle or a front portion of the vehicle and for acquiring an image around a vehicle using at least one of natural light, light of a headlight, and infrared ray, a radar 112 disposed on the front portion of the vehicle and for acquiring a speed and location of a surrounding pedestrian through a radio wave, and an ultrasonic detector 113 disposed on the front portion of the vehicle and for acquiring a distance from a short-distance pedestrian.

Hereinafter, a method of a controlling virtual engine sound of a vehicle according to exemplary embodiments of the present invention will be described in more detail with respect to FIGS. 2 to 7.

Figure 2:
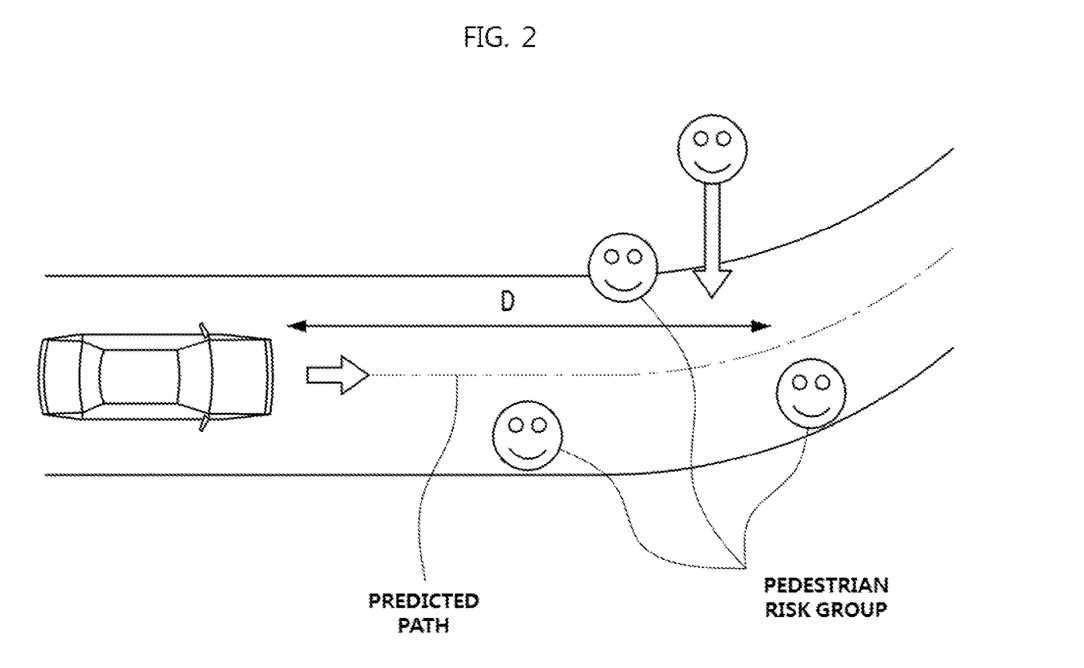
FIG. 2, FIG. 3A, FIG. 3B, FIG. 3C, FIG. 4, FIG. 5A, FIG. 5B, FIG. 6, FIG. 7A, and FIG. 7B are diagrams for explanation of a method of a controlling virtual engine sound of a vehicle according to an exemplary embodiment of the present invention.

Referring to FIG. 2, when state information related to at least one pedestrian positioned in front of the vehicle, detected through the detector 110, includes the number of the at least one pedestrian positioned in front of the vehicle, the number of pedestrians is equal to or greater than a predetermined number, the controller 130 may control the output device 120 configured to generate and output the virtual engine sound.

That is, the controller 130 may predict a driving path of the vehicle using a steering angle of the vehicle and navigation map information and determine an area within a predetermined width W and a predetermined distance D from the predicted driving path as a risk area.

The controller 130 may acquire a location and distance of at least one pedestrian positioned in front of the vehicle using the radar 112 and the ultrasonic detector 113 and detect the at least one pedestrian positioned in the risk area in the predicted driving path as a crash risk group based on the acquired location and distance of the at least one pedestrian.

In addition, when a pedestrian who moves at predetermined speed may be enter a risk area before a rear end portion of the vehicle completely goes past the pedestrian, the pedestrian may also be detected as a crash risk group.

When the number of pedestrians belonging to the detected crash risk group is equal to or greater than a predetermined number, the controller 130 may control the output device 120 configured to generate and output virtual engine sound.

Figure 3A:
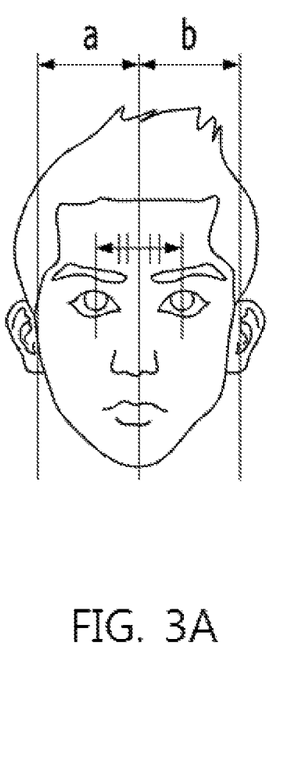
Figure 3B:
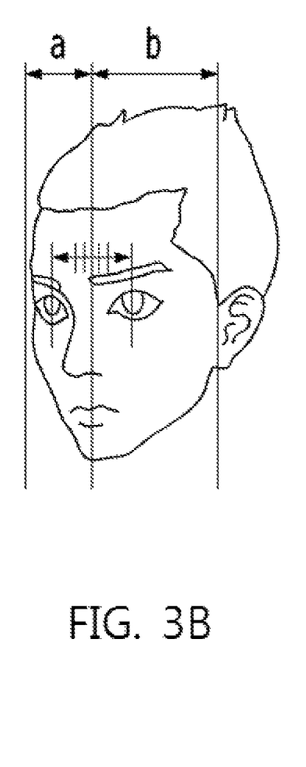
Figure 3C:
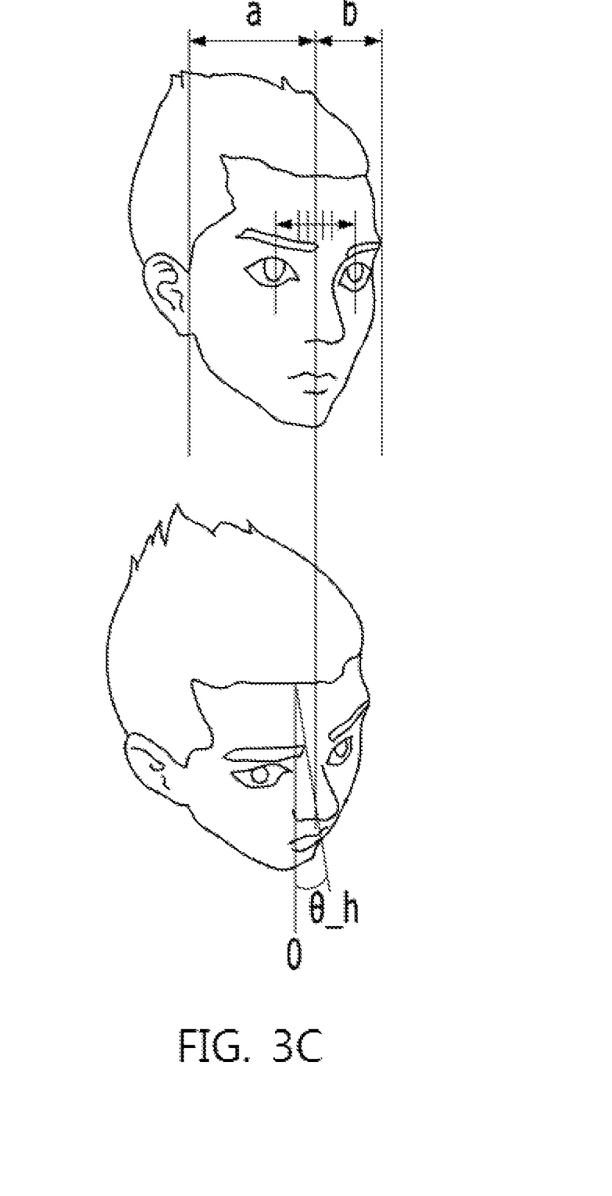
Figure 4:
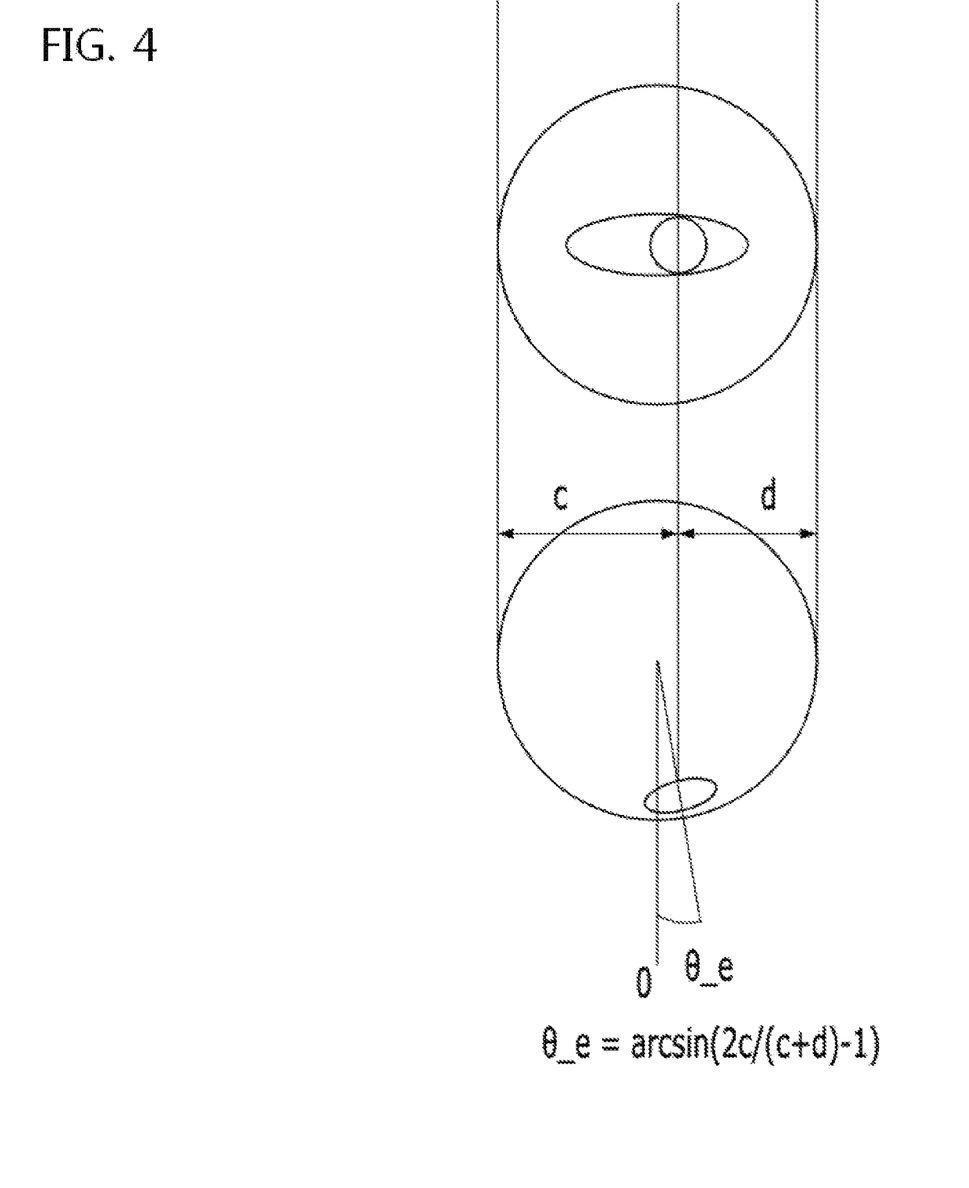
Figure 5A:
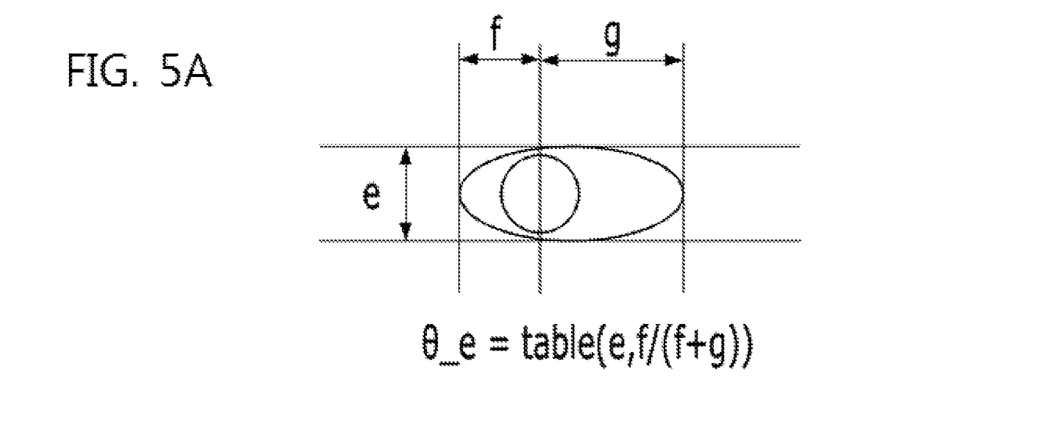
Figure 5B:
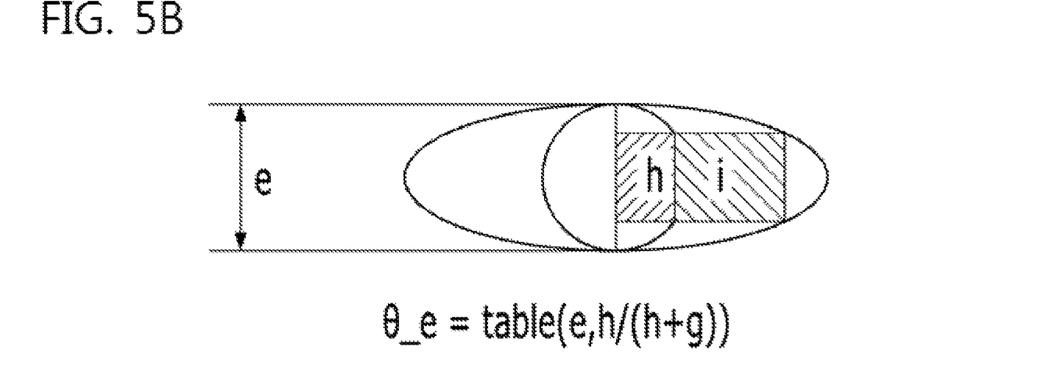

As such, referring to FIG. 3, FIG. 4, and FIG. 5, the camera 111 may receive an image including at least one pedestrian positioned in front of the vehicle. In the instant case, the controller 130 is configured to recognize at least one pedestrian in the received image through the camera 111 and determines the number of the at least one pedestrian. In addition, when the determined number of pedestrians is equal to or greater than a predetermined number, the controller 130 may control the output device 120 configured to generate and output virtual engine sound.

In the instant case, as shown in FIG. 3, the controller 130 may determine the number of at least one pedestrian who is not looking at the vehicle, among at least one pedestrian contained in the image and, when the determined number of pedestrians is equal to or greater than a predetermined number, the controller 130 may control the output device 120 configured to generate and output a virtual engine sound.

That is, the controller 130 may determine a pedestrian, who is not looking at the vehicle, using a face angle of each of the at least one of pedestrian contained in the image.

For example, when left and right ratios of a facial contour are a and b, respectively, based on a central vertical line of the face, a face angle θ_h may be determined according to Equation 1 below.

$$\theta\_h = \arcsin(2a/(a+b)-1) \qquad \text{Equation 1}$$

For example, FIG. 3A illustrates a face of a pedestrian, who is looking at a vehicle based on a face angle, and FIGS. 3B and 3C illustrate a face of a pedestrian, who is not looking at a vehicle based on a face angle.

As such, the controller 130 may determine the number of at least one pedestrian, who is not looking at the vehicle, in the image using an eyeball angle of the at least one pedestrian and, when the determined number of pedestrians is equal to or greater than a predetermined number, the controller 130 may control the output device 120 configured to generate and output a virtual engine sound.

For example, referring to FIG. 4, the eyeball angle θ_e may be determined according to Equation 2 below by estimating the location and size of an eyeball based on a face contour.

$$\theta\_e = \arcsin(2c/(c+d)-1) \qquad \text{Equation 2}$$

In the instant case, c and d are each an estimated distance to an edge portion of an eyeball from a center of an iris.

For example, FIG. 3A illustrates a face of a pedestrian, who is looking at a vehicle, based on a face angle. FIGS. 3B and 3C show a face of a pedestrian, who is not looking at a vehicle, based on a face angle.

In the instant case, when it is difficult to estimate the location and size of an eyeball, a height of an eyelid and left and right ratios based on a location of an iris may be tabulated to estimate an angle of an eyeball, as shown in FIG. 5A.

When it is difficult to estimate the location and size of an eyeball, a ratio of an iris to an eyeball and a ratio of white to the eyeball may be tabulated to estimate an angle of an eyeball, as shown in FIG. 5B.

That is, when a state in which an absolute value of the sum of the face angle θ_h and the eyeball angle θ_e determined via the above procedure is within a reference angle θth is maintained for reference time Tth, the controller 130 may determine that a pedestrian is looking at a vehicle.

When the controller 130 is not configured for determining whether the pedestrian is looking at the vehicle, the controller 130 may consider a corresponding pedestrian as a pedestrian who is not facing a vehicle. In the instant case, a pedestrian, whose eye location is not configured for being determined, includes: a pedestrian who looks down or at a portable phone or a pedestrian, whose face is hidden by an obstacle including a street lamp and a surrounding vehicle.

Figure 6:
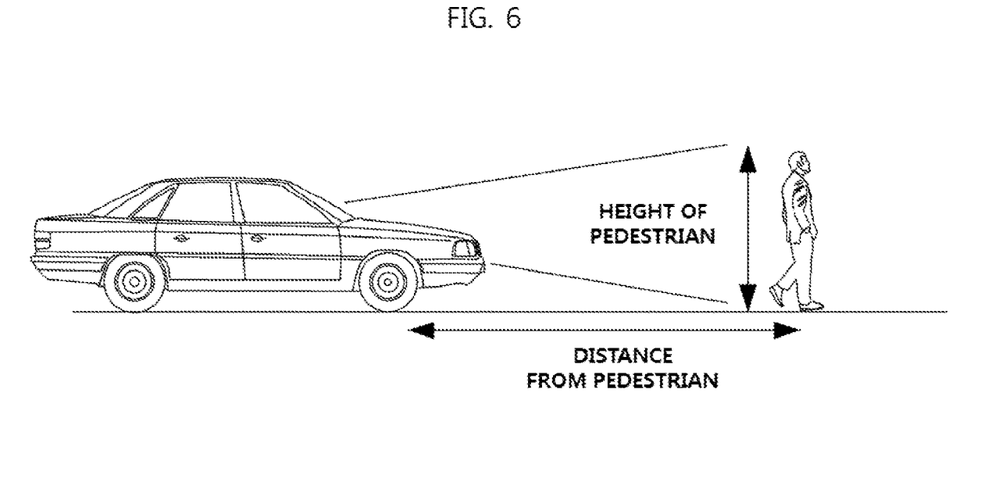

As such, as shown in FIG. 6, the controller 130 may detect a size of at least one pedestrian as at least one object positioned in front of a vehicle through the detector 110, and when the detected size of the pedestrian is equal to or less than a predetermined size, the controller 130 may control the output device 120 configured to generate and output a virtual engine sound.

In more detail, the controller 130 may receive an image including at least one pedestrian positioned in front of a vehicle through the camera 111 and determine a vertical height of an area corresponding to at least one pedestrian in the received image and, when the determined vertical height is equal to or less than a predetermined height, the controller 130 may control the output device 120 configured to generate and output a virtual engine sound.

For example, the predetermined height may be a height corresponding to an average height of a child or an elderly person in a wheelchair.

Figure 7A:
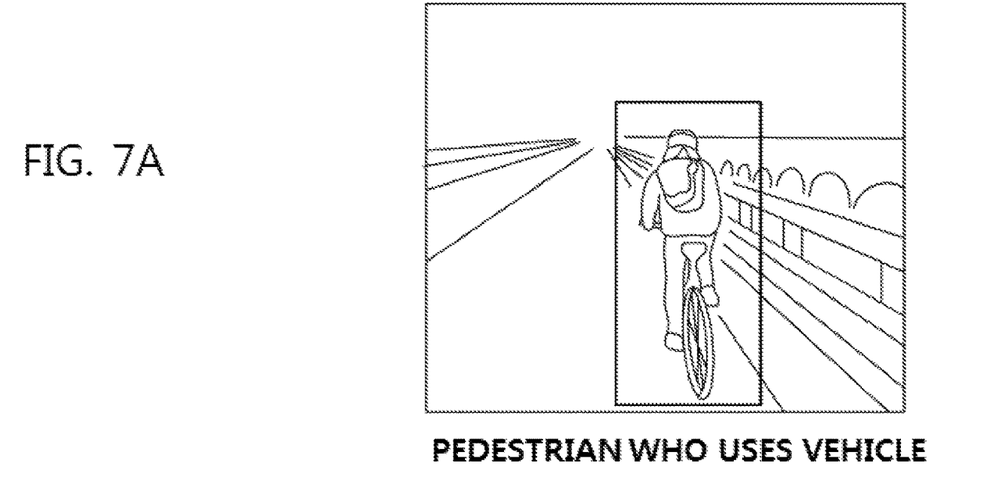

As such, referring to FIG. 7A, the controller 130 may acquire moving speed of a pedestrian in front of a vehicle through the radar 112, determine that the pedestrian uses a vehicle including a bicycle, roller skates, or a scooter when the acquired moving speed is greater than a predetermined speed, and control the output device 120 configured to generate and output the virtual engine sound.

Figure 7B:
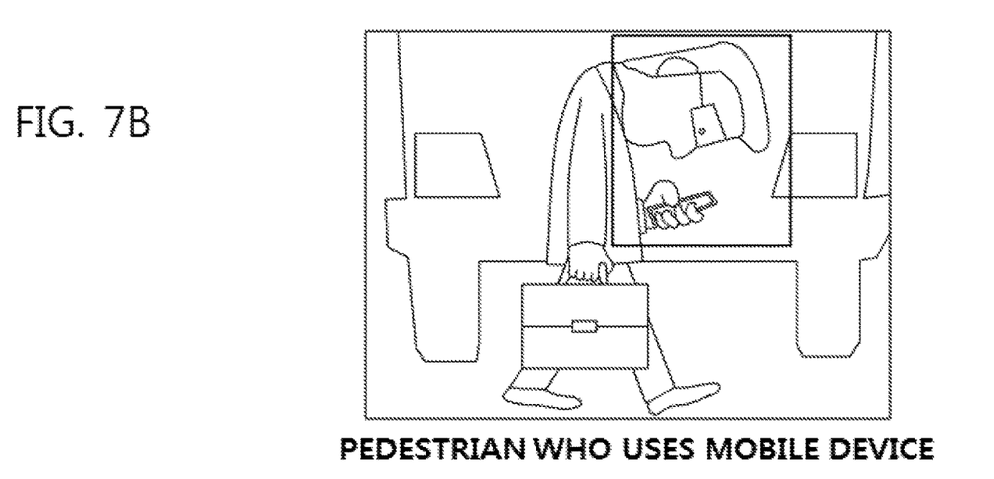

Lastly, referring to FIG. 7B, upon detecting a situation in which both eyes of a pedestrian positioned in front of a vehicle are not configured for being recognized, based on the above description of FIG. 3, FIG. 4, and FIG. 5, corresponding to a case in which the pedestrian looks down or his or her face is partially obscured by a mobile device, the controller 130 may control the output device 120 configured to generate and output the virtual engine sound.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In the above virtual engine sound control apparatus and method of a vehicle related to at least one exemplary embodiment of the present invention, virtual engine sound may be generated by determining a state of a pedestrian and, thus, a silent indoor environment of a vehicle is provided to a driver.

It will be appreciated by persons skilled in the art that the effects that may be achieved with the present invention are not limited to what has been described hereinabove and other advantages of the present invention will be more clearly understood from the above detailed description taken in conjunction with the accompanying drawings.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with respect to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to be configured for others skilled in the art to make and utilize exemplary embodiments of the present invention, as well as alternatives and modifications thereof. It is intended that the scope of the invention be defined by the Claims appended hereto and their equivalents.

What is claimed is:

1. A virtual engine sound control apparatus for a vehicle, the apparatus comprising:
    an output device configured to output a virtual engine sound while the vehicle is driven;
    a detector configured to detect state information related to at least one object disposed in a front of the vehicle while the vehicle is driven; and
    a controller configured to control the output device to generate the virtual engine sound according to the detected state information,
    wherein the state information includes a number of the at least one object disposed in the front of the vehicle, wherein the controller is configured to control the output device to generate the virtual engine sound when the number of the at least one object detected by the detector is equal to or greater than a predetermined number, and wherein the number of the at least one object detected by the detector includes a number of at least one pedestrian whose face is not facing the vehicle.

2. The virtual engine sound control apparatus according to claim 1, wherein the state information further includes a location and distance of the at least one object disposed in the front of the vehicle; and the controller is controlled to predict a driving path of the vehicle and to control the output device to generate the virtual engine sound when the at least one object is disposed within a predetermined distance from the vehicle in the predicted driving path and the number of the at least one object disposed within the predetermined distance in the predicted driving path is equal to or greater than the predetermined number, based on the location and distance of the at least one object.

3. The virtual engine sound control apparatus according to claim 2, wherein the detector includes a radar detector configured to detect the location of the at least one object disposed in the front of the vehicle and an ultrasonic detector configured to detect a distance from the at least one object disposed in the vehicle.

4. The virtual engine sound control apparatus according to claim 1, wherein the detector includes a camera configured to receive an image including the at least one object disposed in the front of the vehicle; and the controller is configured to recognize the at least one object from the image received through the camera and is configured to determine the number of the at least one object.

5. The virtual engine sound control apparatus according to claim 4, wherein the at least one object includes the at least one pedestrian; and the controller is configured to determine the number of at least one pedestrian whose face is not facing the vehicle among the at least one pedestrian contained in the image and is configured to control the output device to generate the virtual engine sound when the determined number of pedestrians is equal to or greater than a predetermined number.

6. The virtual engine sound control apparatus according to claim 5, wherein the controller is configured to determine the number of at least one pedestrian whose face is not facing the vehicle using at least one of a face angle and an eyeball angle of the at least one pedestrian in the image.

7. The virtual engine sound control apparatus according to claim 1, wherein the state information further includes a size of the at least one object disposed in front of the vehicle; and the controller is configured to control the output device to generate the virtual engine sound when a size of the at least one object detected by the detector is equal to or less than a predetermined size.

8. The virtual engine sound control apparatus according to claim 7, wherein the at least one object includes at least one pedestrian;

the detector includes a camera configured to receive an image including the at least one pedestrian disposed in the front of the vehicle; and the controller is configured to determine a vertical height of a predetermined area corresponding to the at least one pedestrian of the image received through the camera and to control the output device to generate the virtual engine sound when the determined vertical height is equal to or less than a predetermined height.

9. A virtual engine sound control method of a vehicle, the method comprising:

detecting state information related to at least one object disposed in a front of the vehicle that is driving at predetermined speed or more; and generating a virtual engine sound for recognizing the vehicle by the at least one object according to the detected state information, wherein the state information includes a number of the at least one object disposed in the front of the vehicle, wherein the generating of the virtual engine sound includes generating the virtual engine sound when the number of the detected at least one object is equal to or greater than a predetermined number, and wherein the number of the at least one object detected by the detector includes a number of at least one pedestrian whose face is not facing the vehicle.

10. The method according to claim 9, wherein the state information further includes a location and distance of the at least one object disposed in the front of the vehicle; and the generating of the virtual engine sound includes predicting a driving path of the vehicle and generating the virtual engine sound when the at least one object is disposed within a predetermined distance from the vehicle in the predicted driving path and the number of the at least one object disposed within the predetermined distance in the predicted driving path is equal to or greater than the predetermined number, based on the location and distance of the at least one object.

11. The method according to claim 9, further including receiving an image including the at least one object disposed in the front of the vehicle, wherein the generating of the virtual engine sound includes recognizing the at least one object from the image received through the camera, determining the number of the at least one object, and generating the virtual engine sound when the determined number of the at least one object is equal to or greater than the predetermined number.

12. The method according to claim 11, wherein the at least one object includes at least one pedestrian; and wherein the generating of the virtual engine sound includes determining the number of at least one pedestrian whose face is not facing the vehicle among the at least one pedestrian contained in the image and controlling the output device to generate the virtual engine sound when the determined number of pedestrians is equal to or greater than a predetermined number.

13. The method according to claim 12, further including determining the number of the at least one pedestrian whose face is not facing the vehicle using at least one of a face angle and an eyeball angle of the at least one pedestrian in the image.

14. The method according to claim 9, wherein the state information further includes a size of the at least one object disposed in front of the vehicle; and the controller is configured to control the output device to generate the virtual engine sound when a size of the at least one object detected by the detector is equal to or less than a predetermined size.

15. The method according to claim 14, further including receiving an image including at least one pedestrian disposed in the front of the vehicle through a camera,
- wherein the at least one object includes the at least one pedestrian; and
- wherein the generating of the virtual engine sound includes determining a vertical height of a predetermined area corresponding to the at least one pedestrian of the received image and generating the virtual engine sound when the determined vertical height is equal to or less than a predetermined height.

* * * * *